United States Patent
El-Maleh et al.

(10) Patent No.: US 7,590,096 B2
(45) Date of Patent: *Sep. 15, 2009

(54) METHOD AND APPARATUS FOR IMPROVED DETECTION OF RATE ERRORS IN VARIABLE RATE RECEIVERS

(75) Inventors: Khaled H. El-Maleh, San Diego, CA (US); Eddie-Lun Tik Choy, Carslbad, CA (US); Arasanipalai K. Ananthapadmanabhan, San Diego, CA (US); Andrew P. DeJaco, San Diego, CA (US); Pengjun Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 810 days.

This patent is subject to a terminal disclaimer.

(21) Appl. No.: 10/938,445

(22) Filed: Sep. 9, 2004

(65) Prior Publication Data

US 2005/0050407 A1    Mar. 3, 2005

Related U.S. Application Data

(63) Continuation of application No. 09/730,147, filed on Dec. 4, 2000, now Pat. No. 6,804,218.

(51) Int. Cl.
  *H04B 7/216*    (2006.01)
  *G10L 19/12*    (2006.01)
  *H04L 27/06*    (2006.01)

(52) U.S. Cl. .................. 370/335; 370/342; 704/223; 714/774

(58) Field of Classification Search ............ None
See application file for complete search history.

(56) References Cited

U.S. PATENT DOCUMENTS

| | | | | |
|---|---|---|---|---|
| 4,901,307 A | * | 2/1990 | Gilhousen et al. | 370/320 |
| 5,103,459 A | * | 4/1992 | Gilhousen et al. | 370/206 |
| 5,414,796 A | * | 5/1995 | Jacobs et al. | 704/221 |
| 5,535,239 A | * | 7/1996 | Padovani et al. | 370/209 |
| 5,745,871 A | * | 4/1998 | Chen | 704/207 |

(Continued)

FOREIGN PATENT DOCUMENTS

JP    06-511320    12/1994

(Continued)

OTHER PUBLICATIONS

TIA/EIA/IS-127-2, TIA/EIA Interim Standard, 3GPP2, Enhanced Variable Rate Codec, Speech Service Option 3 for Wideband Spread Spectrum Digital Systems, Sep. 1999, pp. 1-12.

(Continued)

*Primary Examiner*—Steven Nguyen (57) ABSTRACT

A system and method for detection of rate determination algorithm errors in variable rate communications system receivers. The disclosed embodiments prevent rate determination algorithm errors from causing audible artifacts such as screeches or beeps. The disclosed system and method detects frames with incorrectly determined data rates and performs frame erasure processing and/or memory state clean up to prevent propagation of distortion across multiple frames. Frames with incorrectly determined data rates are detected by checking illegal rate transitions, reserved bits, validating unused filter type bit combinations and analyzing relationships between fixed code-book gains and linear prediction coefficient gains.

54 Claims, 9 Drawing Sheets

U.S. PATENT DOCUMENTS

| | | | | |
|---|---|---|---|---|
| 6,112,325 | A * | 8/2000 | Burshtein | 714/774 |
| 6,141,353 | A * | 10/2000 | Li | 370/465 |
| 6,424,631 | B1 * | 7/2002 | Czaja et al. | 375/147 |
| 6,463,031 | B1 * | 10/2002 | Tran | 370/203 |
| 6,480,556 | B1 * | 11/2002 | Guey | 375/343 |
| 6,804,218 | B2 * | 10/2004 | El-Maleh et al. | 370/335 |
| 6,917,629 | B1 * | 7/2005 | Ramesh et al. | 714/776 |
| 7,080,009 | B2 | 7/2006 | Proctor et al. | |

FOREIGN PATENT DOCUMENTS

| | | |
|---|---|---|
| JP | 2000083079 | 3/2000 |
| JP | 2001501790 | 2/2001 |
| JP | 2003526280 | 9/2003 |
| JP | 2003532354 | 10/2003 |
| KR | 20000052928 | 8/2000 |
| WO | 9813940 | 4/1998 |
| WO | 0035137 | 9/2000 |

OTHER PUBLICATIONS

TIA/EIA/IS-127-2, TIA/EIA Interim Standard, 3GPP2, Enhanced Variable Rate Codec, Speech Service Option 3 for Wideband Spread Spectrum Digital Systems—Addendum 1, Sep. 1999, pp. 1-9, Add. 1.

TIA/EIA/IS-127-2, TIA/EIA Interim Standard, 3GPP2, Enhanced Variable Rate Codec, Speech Service Option 3 for Wideband Spread Spectrum Digital Systems—Addendum 2, Sep. 1999, pp. 1-16, Add. 2.

Conexant, "SMV stage-1 collaboration codec algorithm description", 3GPP2-C11-2000821-012, August of 2000, San Francisco, California.

International Search Report PCT/US01/044574—International Search Authority—European Patent Office -Jul. 3, 2002.

Yang et al: "Joint Source and Channel Coding Based Rate Detection Scheme for Variable-Rate Data Transmission" Department of Electrical and Computer Engineering, University of British Columbia, Vancouver, May 14, 2001, pp. 1-4.

TIA/EIA-IS-95B, "Mobile Station Base Station Compatibility Standard for Wideband Spread Spectrum Cellular Sustems", CDMA 2000, Mar. 1999.

* cited by examiner

FIG. 1 (Prior Art)

FIG. 2A
(Prior Arrt)

FIG. 2B
(Prior Arrt)

FIG. 2C
(Prior Arrt)

FIG. 2D
(Prior Arrt)

METHOD AND APPARATUS FOR IMPROVED DETECTION OF RATE ERRORS IN VARIABLE RATE RECEIVERS

CLAIM OF PRIORITY UNDER 35 U.S.C. §120

The present Application for Patent is a Continuation and claims priority to patent application Ser. No. 09/730,147 entitled "METHOD AND APPARATUS FOR IMPROVED DETECTION OF RATE ERRORS IN VARIABLE RATE RECEIVERS, filed Dec. 4, 2000, now U.S. Pat. No. 6,804,218 assigned to the assignee hereof and hereby expressly incorporated by reference herein.

BACKGROUND

I. Field

The disclosed embodiments relate to wireless communications. More particularly, the disclosed embodiments relate to a novel and improved method and apparatus for detecting, at a receiver of a variable rate communication system, errors in the determination of the rate at which data has been encoded for transmission.

II. Background

Figure 1:
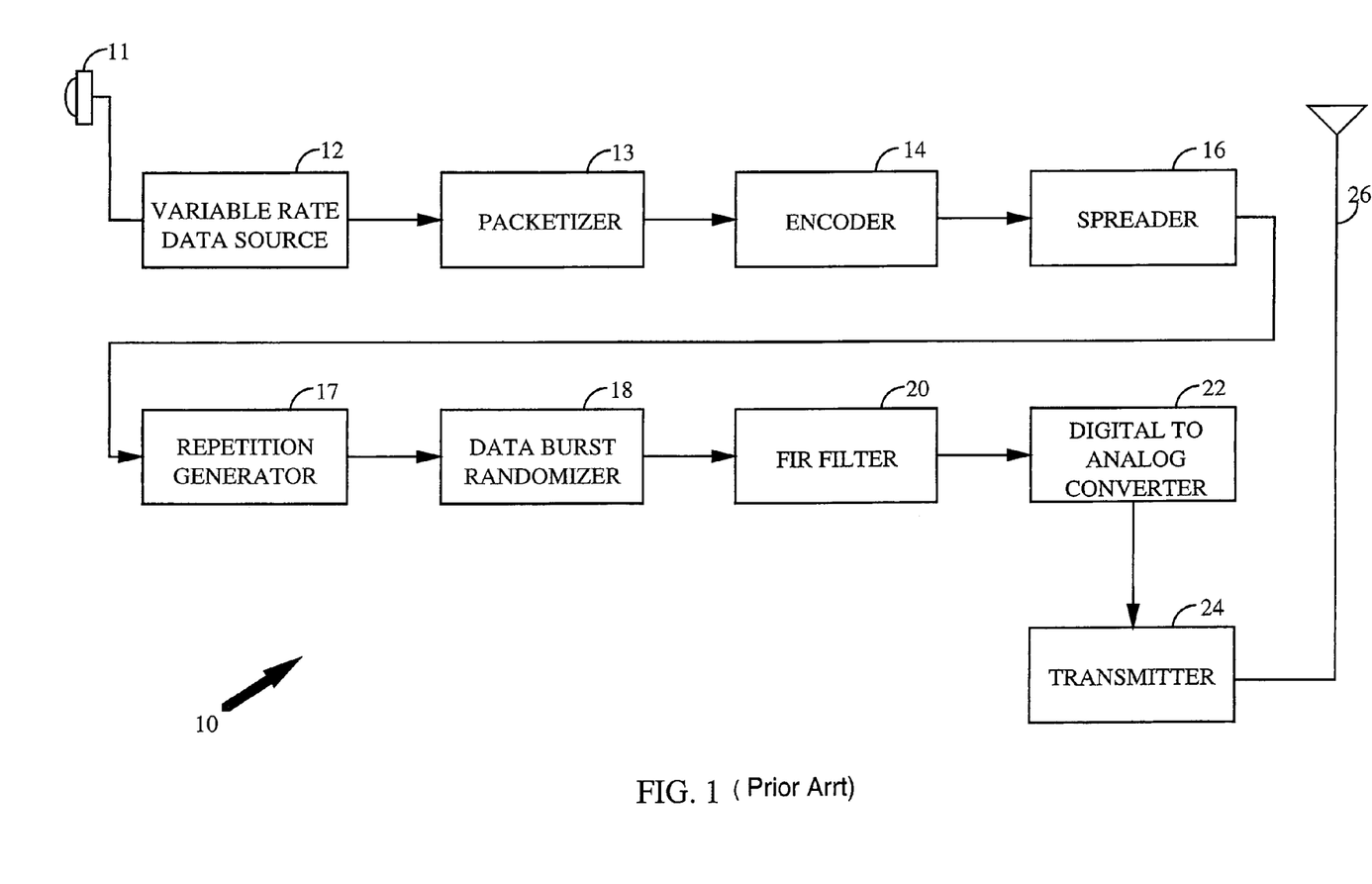
FIG. 1 is a is a step diagram of a conventional transmit portion of a digital cellular telephone system base station.

FIG. 1 is an illustrative step diagram of a variable rate CDMA transmission system 10 described in the Telecommunications Industry Association over-the-air interface standard TIA/EIA Interim Standard 95, and its derivatives, such as, e.g., IS-95B (hereinafter referred to collectively as IS-95). This transmission system may be provided, for example, within a base station of a cellular transmission system for use in transmitting signals to mobile telephone subscriber units within a cell surrounding the base station. It may also be provided within mobile telephone subscriber units for use in transmitting signals to a base station.

A microphone 11 detects a speech signal which is then sampled and digitized by an analog to digital converter (not shown). A variable rate data source 12 receives the digitized samples of the speech signal and encodes the signal to provide packets of encoded speech of equal frame lengths. Variable rate data source 12 may, for example, convert the digitized samples of the input speech to digitized speech parameters representative of the input voice signal using Linear Predictive Coding (LPC) techniques. In an exemplary embodiment, the variable rate data source is a variable rate vocoder as described in detail in U.S. Pat. No. 5,414,796, which is assigned to the assignee of the present invention and is incorporated by reference herein. Variable rate data source 12 provides variable rate packets of data at four possible frame rates 9600 bits per second (bps), 4800 bps, 2400 bps, and 1200 bps, referred to herein as full, half, quarter, and eighth rates. Packets encoded at full rate contain 172 information bits, packets encoded at half rate contain 80 information bits, packets encoded at quarter rate contain 40 information bits, and packets encoded at eighth rate contain 16 information bits. Packet formats are shown in FIGS. 2A-2D. The packets, regardless of size, all are one frame length in duration, i.e. 20 ms. Herein, the terms "frame" and "packet" may be used interchangeably.

The packets are encoded and transmitted at different rates to compress the data contained therein based, in part, on the complexity or amount of information represented by the frame. For example, if the input voice signal includes little or no variation, perhaps because the speaker is not speaking, the information bits of the corresponding packet may be compressed and encoded at eighth rate. This compression results in a loss of resolution of the corresponding portion of the voice signal but, given that the corresponding portion of the voice signal contains little or no information, the reduction in signal resolution is not typically noticeable. Alternatively, if the corresponding input voice signal of the packet includes much information, perhaps because the speaker is actively vocalizing, the packet is encoded at full rate and the compression of the input speech is reduced to achieve better voice quality.

This compression and encoding technique is employed to limit, on the average, the amount of information being transmitted at any one time to thereby allow the overall bandwidth of the transmission system to be utilized more effectively to allow, for example, a greater number of telephone calls to be processed at any one time.

Figure 2A:
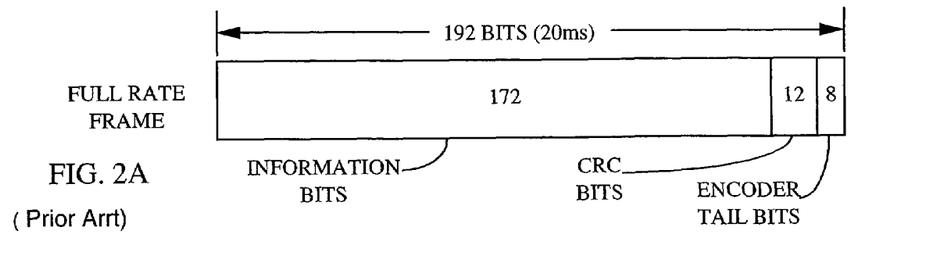
FIGS. 2A-2D are illustrations of conventional frame formats employed by the system of FIG. 1.
Figure 2B:
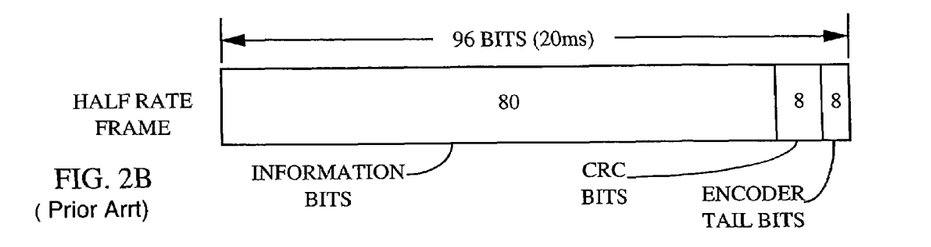
Figure 2C:
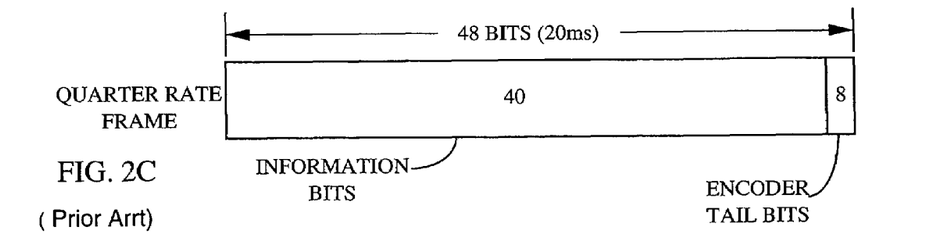
Figure 2D:
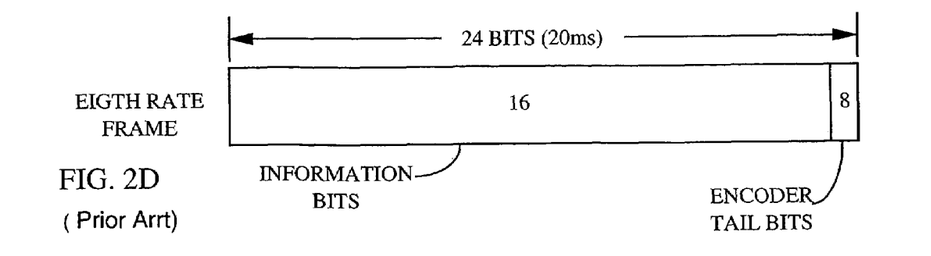

The variable rate packets generated by data source 12 are provided to packetizer 13, which selectively appends Cyclic Redundancy Check (CRC) bits and tail bits. As shown in FIG. 2A, when a frame is encoded by the variable rate data source 12 at full rate, packetizer 13 generates and appends twelve CRC bits and eight tail bits. Similarly, as shown in FIG. 2B, when a frame is encoded by the variable rate data source 12 at half rate, packetizer 13 generates and appends eight CRC bits and eight tail bits. As shown in FIG. 2C, when a frame is encoded by the variable rate data source 12 at quarter rate, packetizer 13 generates and appends eight tail bits. As shown in FIG. 2D, when a frame is encoded by the variable rate data source 12 at eighth rate, packetizer 13 generates and appends eight tail bits.

The variable rate packets from packetizer 13 are then provided to encoder 14, which encodes the bits of the variable rate packets for error detection and correction purposes. In an exemplary embodiment, encoder 14 is a rate ⅓ convolutional encoder. The convolutionally encoded symbols are then provided to a CDMA spreader 16, an implementation of which is described in detail in U.S. Pat. Nos. 5,103,459 and 4,901,307. CDMA spreader 16 maps eight encoded symbols to a 64-bit Walsh symbol and then spreads the Walsh symbols in accordance with a pseudo-random noise (PN) code.

Repetition generator 17 receives the spread packets. For packets of less than full rate, repetition generator 17 generates duplicates of the symbols in the packets to provide packets of a constant data rate. When the variable rate packet is half rate, the repetition generator 17 introduces a factor of two redundancy, i.e., each spread symbol is repeated twice within the output packet. When the variable rate packet is quarter rate, the repetition generator 17 introduces a factor of four redundancy. When the variable rate packet is eighth rate, the repetition generator 17 introduces a factor of eight redundancy.

Repetition generator 17 provides the aforementioned redundancy by dividing the spread data packet into smaller sub-packets referred to as "power control groups." In the exemplary embodiment, each power control group comprises 6 PN spread Walsh Symbols. The constant rate frame is generated by consecutively repeating each power control group the requisite number of times to fill the frame as described above.

The spread packets are then provided to a data burst randomizer 18, which removes the redundancy from the spread packets in accordance with a pseudo-random process as described in U.S. Pat. No. 5,535,239, assigned to the assignee of the present invention. Data burst randomizer 18 selects one of the spread power control groups for transmission in accordance with a pseudo-random selection process and gates the other redundant copies of that power control group.

The packets are provided by data burst randomizer 18 to finite impulse response (FIR) filter 20, an example of which is described in U.S. Pat. No. 5,659,569, and assigned to the assignee of the present invention. The filtered signal is then provided to digital to analog converter 22 and converted to an analog signal. The analog signal is then provided to transmitter 24, which up-converts and amplifies the signal for transmission through antenna 26.

Figure 3:
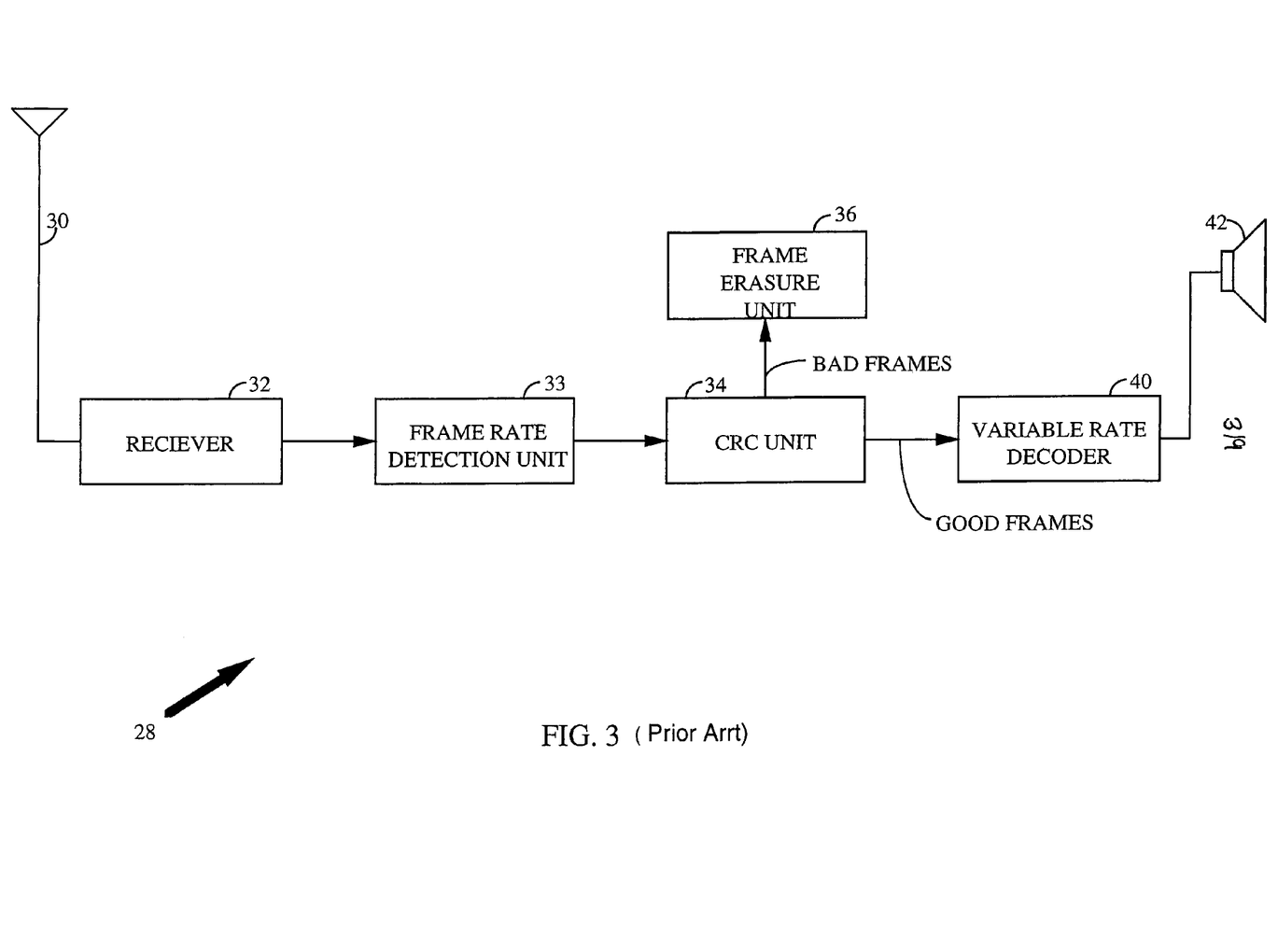
FIG. 3 is a step diagram of a conventional receive portion of a cellular telephone, configured without the disclosed embodiments, for receiving signals transmitted by the system of FIG. 1.

FIG. 3 illustrates pertinent components of a base station. In another embodiment, the apparatus of FIG. 3 could reside in a mobile telephone 28 or other mobile station receiving the transmitted signal. The signal is received by antenna 30, down-converted and amplified, if necessary, by receiver 32. The signal is then provided to frame rate detection unit 33, which subdivides the signal into packets and determines the corresponding frame rate for each packet. The frame rate may be determined, depending upon the implementation, by detecting the duration of individual bits of the frame. The packet and a signal identifying the detected frame rate for the packet are then forwarded to CRC unit 34 for performing cyclic redundancy checks or related error detection checks in an attempt to verify that no transmission errors or frame rate detection errors occurred. A frame rate detection error results in the packet being sampled at an incorrect rate resulting in a sequence of bits that are effectively random. A transmission error typically results in only one or two bits being in error. Usually, if a transmission error or frame rate detection error occurs, the CRC unit detects the error. "Bad" frames failing the CRC are erased or otherwise discarded by frame erasure unit 36. "Good" frames which pass the CRC are routed to variable rate decoder 40 for conversion back to digitized voice signals. The digitized voice signals are converted to analog signals by a digital to analog converter (not shown) for ultimate output through a speaker 42 of the mobile telephone.

Depending upon the implementation, no separate frame erasure unit 36 is necessarily required. Rather, CRC unit 34 may be configured merely to not output bad frames to variable rate decoder 40. However, provision of a frame erasure unit facilitates generation of frame erasure signals for forwarding back to the base station to notify the base station of the frame erasure error. The base station may use the frame erasure information to modulate the amount of power employed to transmit signals, perhaps as part of a feedback system intended to minimize transmitted power while also minimizing frame errors.

As noted above, by varying the frame rate of packets to thereby compress the information contained therein, the overall bandwidth of the system is utilized more effectively, usually without any noticeable effect on the transmitted signal. However, problems occur occasionally which have a noticeable effect. One such problem occurs if a frame subject to a frame rate detection error or a transmission error nevertheless passes the CRC. In such cases, the bad frame is not erased but is processed along with other good frames. The error may or may not be noticeable. For example, if the error is a transmission error wherein only one or two bits of encoded speech are in error, the error may have only an extremely slight and probably unnoticeable effect on the output voice signal. However, if the error is a frame rate detection error, the entire packet will thereby be processed using the incorrect frame rate causing effectively random bits to be input to the decoder, likely resulting in a noticeable artifact in the output voice signal. Noticeable artifacts caused by frame rate detection errors are such unacceptable distortions as screeches, or beeps. For some systems, it has been found that incorrect frame rate detections occur with a probability of about 0.005% yielding an incorrectly received packet and a corresponding artifact in the output voice signal about every sixteen minutes of conversation time. Although described with respect to a CDMA system using IS-95 protocols, similar problems can occur in almost any transmission system employing variable transmission rates and in related systems as well.

Due to effects of channel conditions such as noise, and multi-path fading on received parameters, rate determination algorithms (RDA) of frame rate detection units 33 do not guarantee that the received frame rate is correct. Given that this is a limitation of the RDA, it is desirable to ensure that such RDA errors don't cause audible artifacts such as screeches, or beeps. When the received frame is not suitable for accurate rate-determination due to poor channel conditions, the RDA either determines that the frame has to be erased or it assigns an incorrect rate to the packet. Typically, the speech decoder has a frame-erasure processing mechanism that perceptually smooths the lost frames using past frames, and produces speech that is not annoying to the listener. However, if instead of a frame erasure, the RDA assigns an incorrect rate to the frame, random bits are fed into the variable rate decoder 40. Unless detected, the random bits can produce very loud, annoying artifacts such as screeches, and beeps. It is generally true that a frame-erasure does not produce as much speech quality degradations as an incorrect rate frame.

It is desirable to handle these incorrect rate frames without generating audible artifacts. It is desirable to detect an incorrect rate frame, and perform frame-erasure processing, and/or clean-up the memory states in the variable rate decoder 40, such that effects of incorrect rate determination do not propagate across many frames.

Therefore, it can be appreciated that there is a significant need for a method that detects rate determination errors in a wireless communication system, and eliminates resultant audible artifacts.

SUMMARY

The disclosed embodiments are directed to a system and method for detection of rate determination algorithm errors in variable rate communications system receivers. Accordingly, a method for detecting rate errors in a variable rate receiver, comprising receiving an encoded speech signal, performing a rate determination algorithm on the speech signal to provide an encoded rate, and detecting errors in the provided rate, is described.

In another embodiment, A rate error detection system, comprising a receiver for receiving an encoded speech signal, a rate determination element for performing a rate determination algorithm on the speech signal to provide an encoded rate, and a rate error detector for detecting errors in the provided rate, is described.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION OF THE PREFERRED EMBODIMENTS

An exemplary embodiment of improved detection of rate errors in variable rate receivers is implemented in a Selectable Mode Vocoder (SMV). The SMV is a variable rate vocoder, and is a candidate to be used by the third generation CDMA system, IS2000. The SMV vocoder algorithm uses a variety of parameters such as source-controlled rate, frame-type, LP coefficients, adaptive, and fixed code-book parameters. Speech to be encoded is analyzed for the amount of perceptual information it contains. The analysis classifies speech into various types such as background noise, stationary unvoiced speech, stationary voiced speech, and non-stationary speech (onsets, transients, etc.). Inter-speech background noise is encoded using eighth rate. Stationary unvoiced speech is encoded using a quarter-rate Noise Excited Linear Prediction (NELP) scheme. Stationary voiced speech is encoded using a full or half rate Type-1 CELP scheme. Non-stationary speech is encoded using a full or half rate Type-0 CELP scheme. The Type information controls several aspects of the coding of the frame, such as the sub-frame size, the parameters used for speech representation, and the coding scheme for these parameters. Frames of type 0 are "non-periodic" frames, where the typical parameters, such as pitch correlation and pitch lag, can change rapidly. Thus, in Type-0 CELP the pitch lag is coded and transmitted more frequently (i.e., for every sub-frame). Frames of Type-1 are "periodic" frames that have high periodicity and are perceptually well represented with a smooth pitch track. In Type-1 CELP the pitch lag is coded once per frame, and the interpolated pitch track is derived from this lag. Because of the high periodicity and the smooth pitch track, the pitch gains exhibit very stable behavior and are jointly quantized. One bit of each stationary voiced and non-stationary speech frame is used to indicate the CELP scheme type.

One skilled in the art would recognize that the SMV may be implemented using field-programmable gate arrays (FPGAs), programmable logic devices (PLDs), digital signal processors (DSPs), one or more microprocessors, an application specific integrated circuit (ASIC), or any other device capable of performing the SMV functions described above.

The disclosed embodiments are described in the context of CDMA phones. However, it should be understood that the disclosed embodiments are applicable to other types of communications systems and modulation techniques, such as Personal Communications Systems (PCS), wireless local loop (WLL), private branch exchange (PBX), or other known systems. Furthermore, systems utilizing other well known transmission modulation schemes such as TDMA and FDMA as well as other spread spectrum systems may employ the disclosed embodiments.

Figure 4:
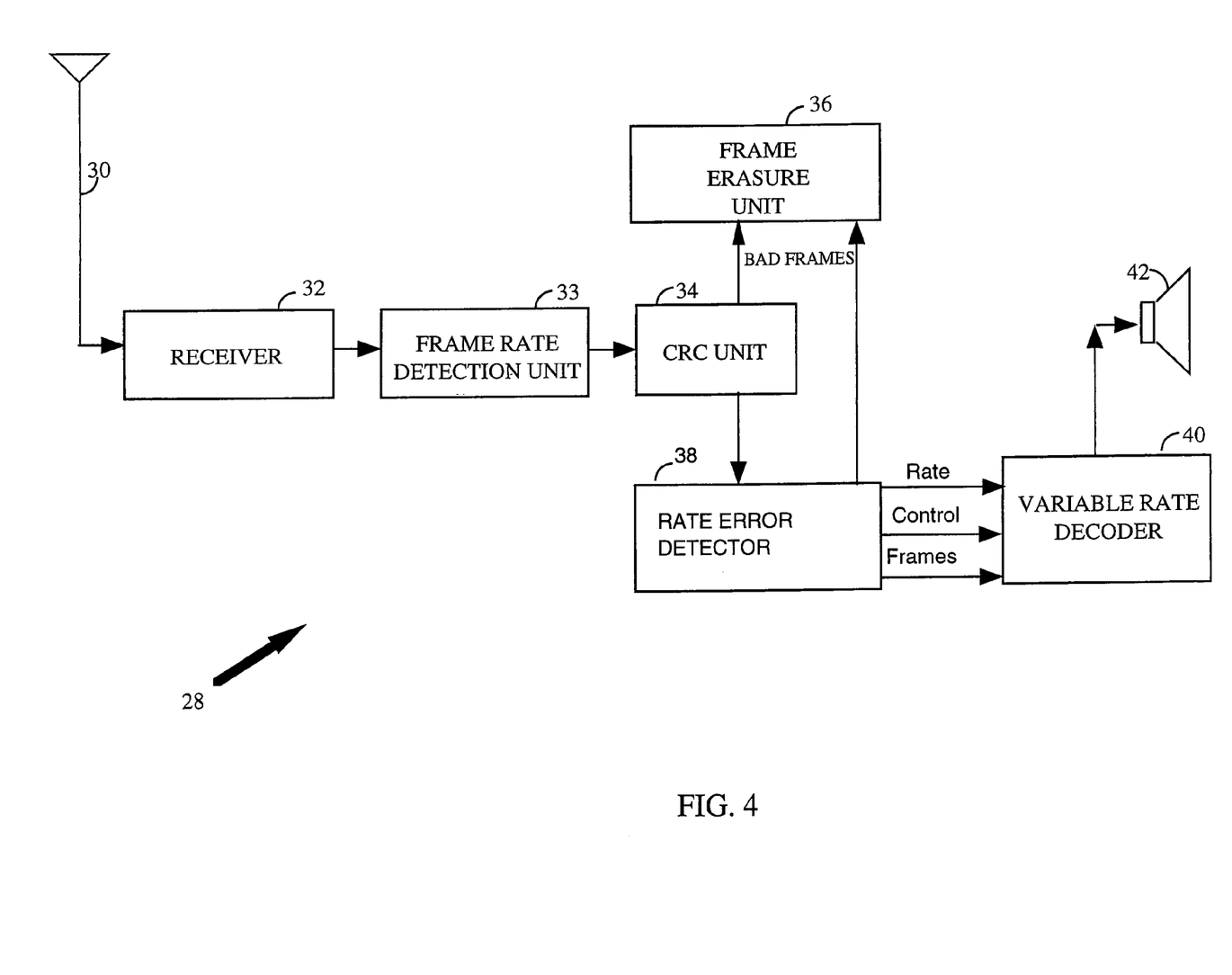
FIG. 4 is a step diagram of a receive portion of a mobile subscriber unit, configured in accordance with the disclosed embodiments of a rate error detector, for receiving signals transmitted by the system of FIG. 1.

In accordance with one embodiment, FIG. 4 illustrates pertinent components of a mobile subscriber unit 28, or other mobile station, receiving a signal provided by a base station transmission system such as the system of FIG. 1 wherein a signal having variable rate packets is transmitted. Frame rates include full rate, half rate, quarter rate, and eighth rate as shown in FIGS. 2A-2D. The packets include encoded speech parameters representative of a compressed voice signal. In addition, each packet includes CRC bits and/or encoder tail bits. Additional details regarding the content of the packets is provided above in connection with FIG. 1 and in U.S. Pat. No. 5,414,796 referenced above.

The illustrated components of FIG. 4 are similar to those of FIG. 3 and only pertinent differences will be described in detail. The transmitted signal is received by antenna 30, and downconverted and amplified by receiver 32. The signal is then provided to a frame rate detection unit 33, which attempts to determine the corresponding frame rate for the packet, using a Rate Determination Algorithm (RDA). The packet is then provided to a CRC unit 34 for performing cyclic redundancy checks on frames of the received signal in an attempt to verify that no frame rate detection error or transmission error occurred. Frames failing the CRC, i.e. bad frames, are erased by frame erasure unit 36. As noted above, no separate frame erasure unit is necessarily required. Rather, frames subject to CRC errors may merely not be output from the CRC unit 34. In either case, frames that pass the CRC, i.e. potentially good frames, are routed to a rate error detector 38. Depending upon the implementation, no separate rate error detector unit 38 is necessarily required. Rather, rate error detector unit 38 may be implemented in the SMV or integrated with other receiver components.

The rate error detector 38 further examines the frames to verify that the frame rate detected by the RDA of frame rate detection unit 33 is indeed correct. The frames are further verified by rate error detector 38 using the verification methods for full, half, quarter, and eighth rate frames described below in detail with reference to FIGS. 5-8. Frames failing verification may be erased by frame erasure unit 36. Frames failing verification may also be processed to clean up memory states in the variable rate decoder 40 so that distortion does not propagate across many frames. Rate, control, and frame information is output from the rate error detector 38 to the variable rate decoder 40 for cleanup processing. Frames that pass the rate error detector verification are routed directly to variable rate decoder 40.

Variable rate decoder 40 processes the frames by decoding speech parameters contained therein for conversion back to digitized voice signals. The digitized voice signals are ultimately converted to analog signals by a digital to analog converter (not shown) for output through a speaker 42 of the to a listener when the receiver is a mobile subscriber unit. The digital signal may be further propagated within a wireless system when the receiver is a base station.

FIGS. 5-8 describe in detail the frame rate verification methods in accordance with the embodiments for full, half, quarter, and eighth rate frames performed by the rate error detector (FIG. 4, element 38). The verification methods employ novel use of illegal classification transitions for frames of specified rates and types, reserved bit checking, illegal filter type verification, and analysis of fixed codebook (FCB) vs. LPC threshold gain curves. Additionally, the disclosed embodiments of FIGS. 5-8 employ novel use of frame erasure processing and memory state manipulation to smooth effects of detected frame rate errors.

The disclosed embodiments impose a novel state transition structure on rate transitions of consecutive frames based on knowledge of speech classification and the phonetic character of conversational speech. Rate transitions that violate the structure are illegal, and are used to detect frames rate errors. These illegal rate transitions are defined to comprise:

a full-rate frame followed by an eighth-rate frame;

a full-rate, Type-1 frame followed by an eighth-rate frame;

a half-rate, Type-1 frame followed by an eighth-rate frame;

a quarter-rate frame followed by a Type-1 full-rate frame;

a quarter-rate frame followed by a Type-1 half-rate frame;

an eighth-rate frame followed by a Type-1 full-rate frame;

an eighth-rate frame followed by a Type-1 half-rate frame;

an eighth-rate frame followed by a quarter-rate frame followed by an eighth-rate frame;

an eighth-rate frame followed by a half-rate frame followed by an eighth-rate frame; and an eighth-rate frame followed by a full-rate frame followed by an eighth-rate frame.

Based on the current and previous frame rates and types, the presence of illegal transitions indicates an RDA error in either the current frame or the previous frame.

The disclosed embodiments employ novel use of full rate and quarter rate reserved transmitted bits for detecting RDA errors. A full-rate packet has 171 information bits per 20 ms frame, in which 1 bit is a reserve bit. The reserve bit can be set by an encoder to a fixed value of either zero or one. The reserved bit is checked by the rate error detector (FIG. 4, element 38) to determine whether the received reserve bit has the expected fixed encoded value. Reserved bits not received as expected indicate an RDA error in the current full rate frame. A quarter-rate packet has 40 bits per 20 ms frame in which NELP uses 39 bits, while one bit is unused. Again, the unused bit can be set by the encoder to a fixed value of either zero or one. The unused bit is checked by the rate error detector (FIG. 4, element 38) to determine whether the received unused bit has the expected fixed encoded value. Unused bits not received as expected indicate an RDA error in the current quarter rate frame.

The disclosed embodiments employ novel use of illegal filter type checking for quarter rate NELP frames to detect rate errors. NELP encoding employs spectral shaping of pseudo-random excitation using one of 3 different shaping filters. Two bits are used to transmit the index of the selected filter. Three of the two-bit patterns are used to identify the selected shaping filter, leaving a fourth 2-bit pattern unused, or illegal. Presence of the unused, or illegal pattern indicates an RDA error in the current quarter rate NELP frame.

The disclosed embodiments employ novel use of encoded parameters for detecting rate errors. Investigations into effects of RDA errors on vocoders reveal that audio artifacts such as screeches and beeps are mainly caused by excessively high FCB gain values accompanied by high LPC prediction gain values. Natural speech, when analyzed by an encoder for encoding parameters, produces FCB gains and LPC prediction gains that have an inverse relation with respect to each other. In other words, when the LPC gain is high, the FCB gains is generally low, and when the LPC gain is low, the FCB gain is generally high.

Figure 9:
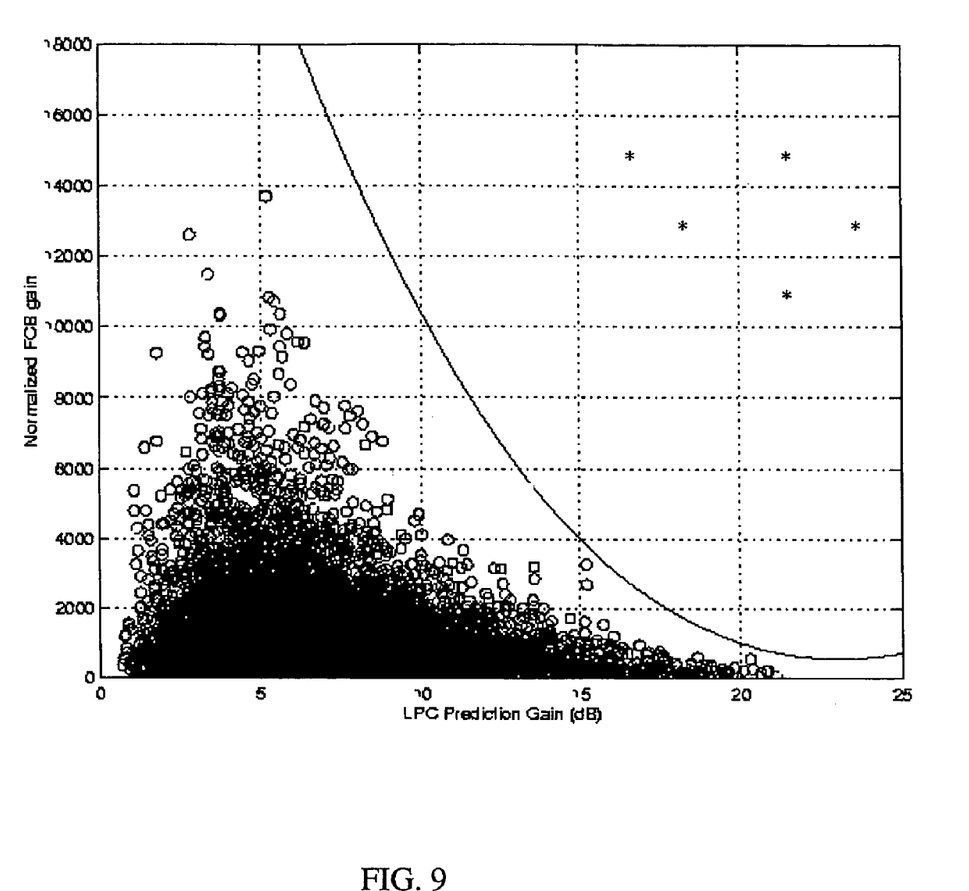
FIG. 9 is graph illustrating an exemplary fixed codebook gain vs. LPC threshold curve.

The inverse relationship of FCB gains and LPC gains in natural speech produce a curve in the graph of FCB gain vs. LPC gain above which there is no representation of good natural speech. The FCB gain, and hence the graphical curve can be a function of the input speech level. Frames received at levels above the curve, where there is no representation of good natural speech indicate a rate error in the frame. A novel method for removing the variance due to the input level, when a rate error is graphically detected, is to normalize the FCB gain using an average energy value computed from past frames. FIG. 9 shows a scatter plot indicating the relationship between the normalized FCB gain and the LP prediction gain. Circles below the solid curve were generated by clean speech, and the asterisks above the solid lines correspond to unacceptable screeches caused by RDA errors. The solid curve represents a threshold curve that separates the region of good speech from unacceptable screeches or other artifacts. This threshold can easily be represented in a parametric form and incorporated into the rate error detector (FIG. 4, element 38). After the FCB gain and the LPC gains have been established for a received packet, a check can be performed to determine if the frame lies below the threshold curve. If the frame does not lie below the threshold cure, screeching due to an RDA error is indicated.

The disclosed embodiments employ novel use of eighth rate excitation gain to detect rate errors. Because the eighth-rate coding scheme is used only for background noise portions of speech, the excitation energy, which is quantized using a gain parameter, has an upper limit. When the excitation gain is obtained from the received packets, a check can be performed to see if the excitation gain lies below the gain parameter upper limit. An RDA error is indicated if the gain parameter does not lie below the upper limit.

When any of the disclosed detection mechanisms indicates a frame rate error in either the current frame or immediately preceding frames, the disclosed embodiments may employ one or more novel schemes while decoding to eliminate the resultant distortion and/or prevent the distortion from propagating across multiple frames. The schemes comprise frame erasure processing, reduction of FCB gain, and resetting of memory states.

Vocoders typically have a built-in process to handle frame erasures. The frame erasure process can be used by the disclosed embodiments for any frame in which the rate error detector (FIG. 4, element 38) has detected an RDA error. The frame erasure process synthesizes speech without using any information from the current frame, and derives all the decoder parameters from the past memory in order to produce speech that is perceptually smoothed with respect to the previous frames.

When a rate error is detected because a frame is received at a level above the FCB vs. LPC gain curve where there is no representation of good natural speech, the decoder (FIG. 4, element 40) can forcibly reduce the FCB gain to a lesser value that will prevent a high energy screech or beep from being produced at the output of the decoder (FIG. 4, element 40).

Vocoder algorithms typically reconstruct speech using past memory states. These memory states include the Moving-average vector quantizer (MAVQ) memory for FCB gain, excitation memory, LPC synthesis memory, and post-filter synthesis memory. An undetected RDA error can inject bad values into these memories. The effects of bad values can last for many frames in the future, even if all the future frames are healthy frames. To prevent corruption of future frames RDA errors detected as described in the current or immediately previous frames, can cause the FCB gain MAVQ, Excitation, LPC synthesis filter, and Post-filter synthesis filter memories to be reset to predefined values that do not produce high energy screeches. In one embodiment, the memory values are overwritten with zeros. In another embodiment, the memory values are overwritten with their respective initialization values.

Figure 5:
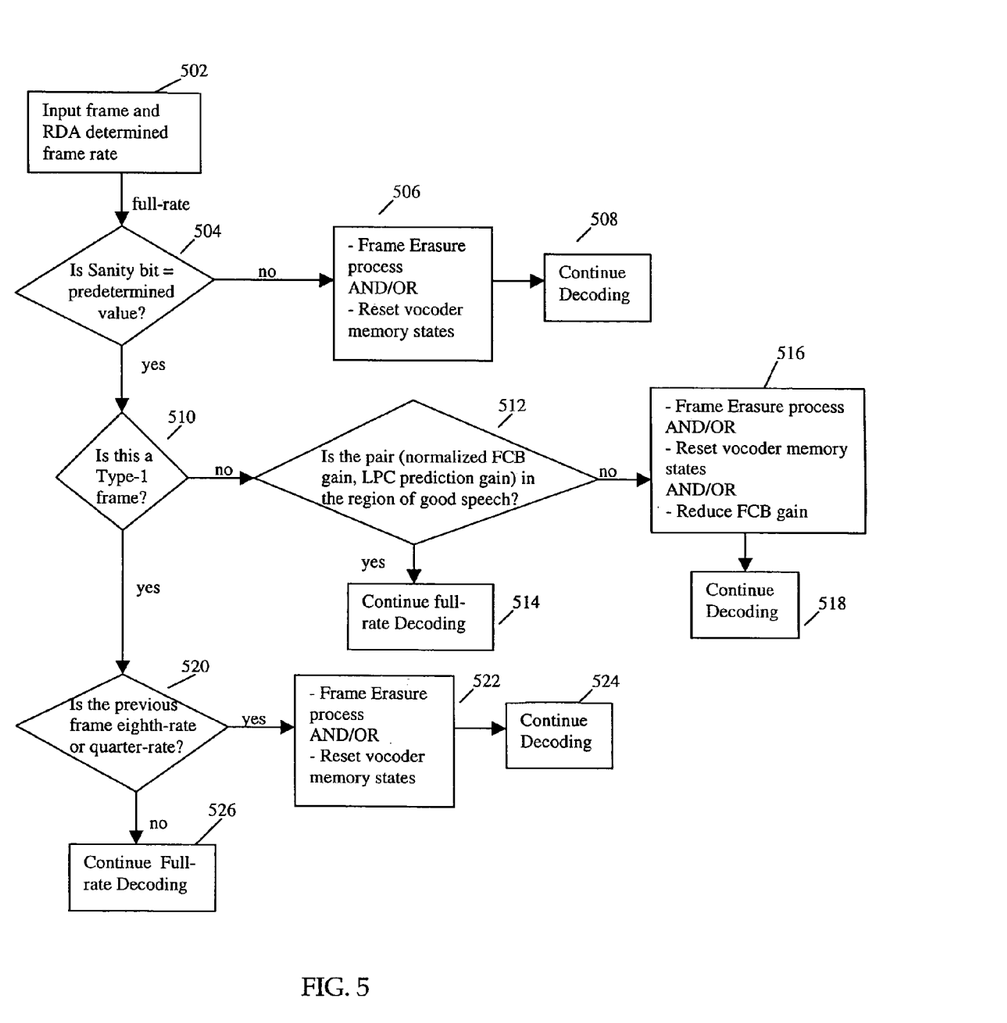
FIG. 5 is a flowchart diagram of a method for detection of rate errors in frames identified as full rate frames.

FIG. 5 illustrates a method in accordance with one embodiment for detection of rate errors in frames identified by the RDA as full rate frames. One skilled in the art will understand that the ordering of steps illustrated in FIG. 5 is not limiting.

The method is readily amended by omission or re-ordering of the steps illustrated without departing from the scope of the disclosed embodiments.

In step 502, the rate error detector inputs a data frame determined by the RDA to be a full rate frame. Control flows to step 504.

In step 504, the reserved bit or sanity bit is tested to determine whether the received value equals the fixed value set by the encoder. If the bit is not equal to the fixed value set by the encoder, indicating a frame rate error, control flow proceeds to step 506. Otherwise, control flow proceeds to step 510.

In step 506, frame erasure processing and/or memory state reset processing is performed. Control flow proceeds to step 508 where decoding continues.

In step 510, the frame is checked to determine whether it is frame type. If the frame is a Type-0 frame, control flow proceeds to step 512. If the frame is a Type-1 frame, control flow proceeds to step 520.

In step 512, for a Type-0 frame, the FCB and LPC gains are established for the frame, and a check is performed to determine if the frame lies below the threshold curve. If the frame lies below the threshold cure, control flow proceeds to step 514 where decoding continues. If the frame does not lie below the threshold cure, control flow proceeds to step 516.

In step 516, frame erasure processing, and/or FCB gain reduction, and/or memory state reset processing may be performed. Control flow proceeds to step 518 where decoding continues.

In step 520, for a Type-1 frame, the previous frame is checked to determine if the frame is an eighth rate frame, or a quarter rate frame. If the previous frame is not an eighth rate or quarter rate frame, indicating a legal rate transition, control flow proceeds to step 526 where full rate decoding continues. If the previous frame is an eighth, or quarter rate frame, indicating an illegal rate transition, control flow proceeds to step 522.

In step 522, frame erasure processing, and/or memory state reset processing may be performed. Control flow proceeds to step 524 where decoding continues.

Figure 6:
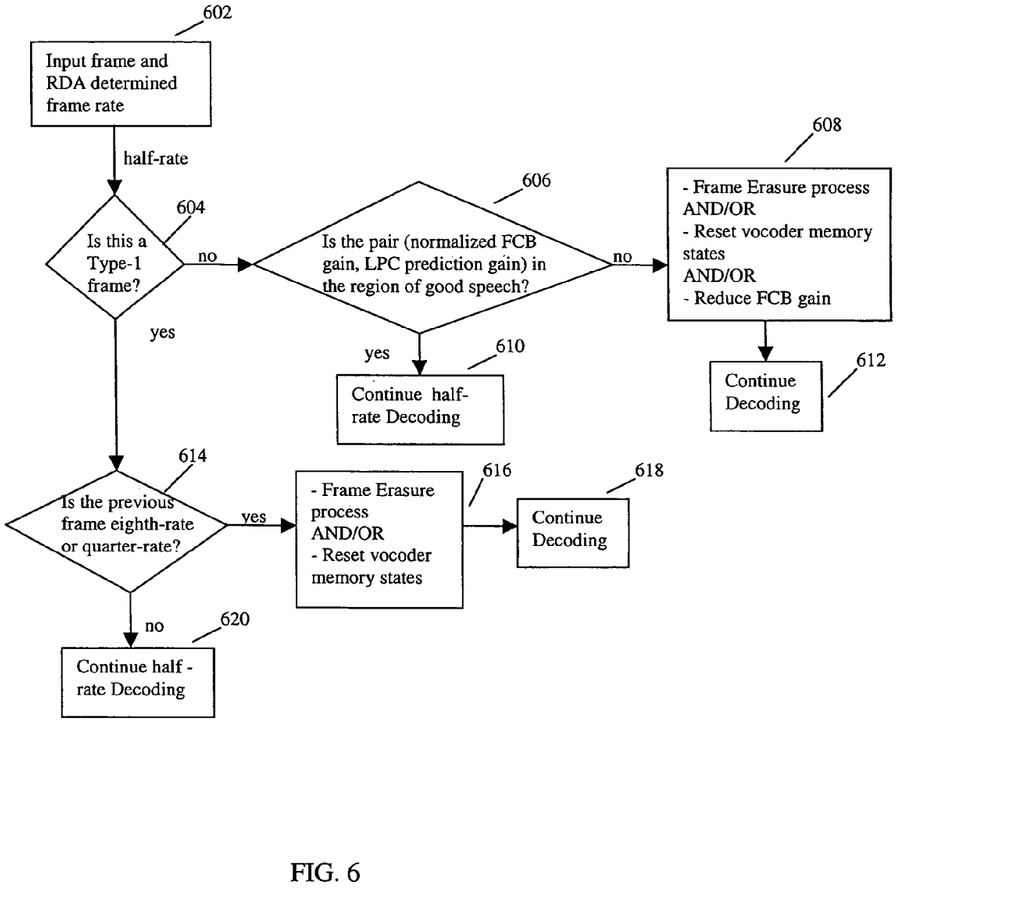
FIG. 6 is a flowchart diagram of a method for detection of rate errors in frames identified as half rate frames.

FIG. 6 illustrates a method in accordance with one embodiment for detection of rate errors in frames identified by the RDA as half rate frames. One skilled in the art will understand that the ordering of steps illustrated in FIG. 6 is not limiting. The method is readily amended by omission or re-ordering of the steps illustrated without departing from the scope of the disclosed embodiments.

In step 602, the rate error detector inputs a data frame determined by the RDA to be a half rate frame. Control flows to step 604.

In step 604, the frame is checked for frame type. If the frame is a Type-0 frame, control flow proceeds to step 606. If the frame is a Type-1 frame, control flow proceeds to step 614.

In step 606, for a Type-0 frame, the FCB and LPC gains are established for the frame, and a check is performed to determine if the frame lies below the threshold curve. If the frame lies below the threshold cure, control flow proceeds to step 610 where decoding continues. If the frame does not lie below the threshold cure, control flow proceeds to step 608.

In step 608, frame erasure processing, and/or FCB gain reduction, and/or memory state reset processing may be performed. Control flow proceeds to step 612 where decoding continues.

In step 614, for a Type-1 frame, the previous frame is checked to determine if the frame is an eighth rate, or quarter rate frame. If the previous frame is not an eighth rate or quarter rate frame, indicating a legal rate transition, control flow proceeds to step 620 where half rate decoding continues. If the previous frame is an eighth rate or quarter rate frame, indicating an illegal rate transition, control flow proceeds to step 616.

In step 616, frame erasure processing, and/or memory state reset processing may be performed. Control flow proceeds to step 618 where decoding continues.

Figure 7:
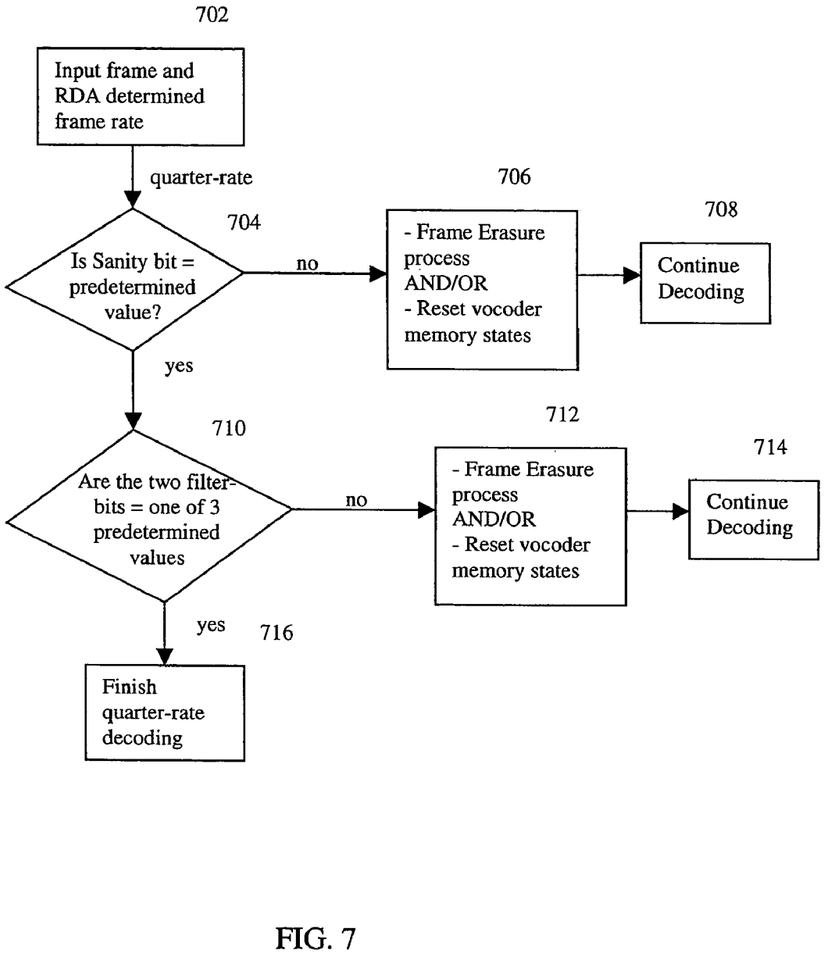
FIG. 7 is a flowchart diagram of a method for detection of rate errors in frames identified as quarter rate frames.

FIG. 7 illustrates a method in accordance with one embodiment for detection of rate errors in frames identified by the RDA as quarter rate frames. One skilled in the art will understand that the ordering of steps illustrated in FIG. 7 is not limiting. The method is readily amended by omission or re-ordering of the steps illustrated without departing from the scope of the disclosed embodiments.

In step 702, the rate error detector inputs a data frame determined by the RDA to be a quarter rate frame. Control flows to step 704.

In step 704, the reserved bit or sanity bit is tested to determine whether the received value equals the fixed value set by the encoder. If the bit is not equal to the fixed value set by the encoder, indicating a frame rate error, control flow proceeds to step 706. Otherwise, control flow proceeds to step 710.

In step 706, frame erasure processing and/or memory state reset processing is performed. Control flow proceeds to step 708 where decoding continues.

In step 710, the two-bit pattern used to identify the selected shaping filter is validated. If two-bit pattern is valid, control flow proceeds to step 716 where quarter rate decoding continues. If the two-bit pattern is not valid, control flow proceeds to step 712.

In step 712, frame erasure processing and/or memory state reset processing is performed. Control flow proceeds to step 714 where decoding continues.

Figure 8:
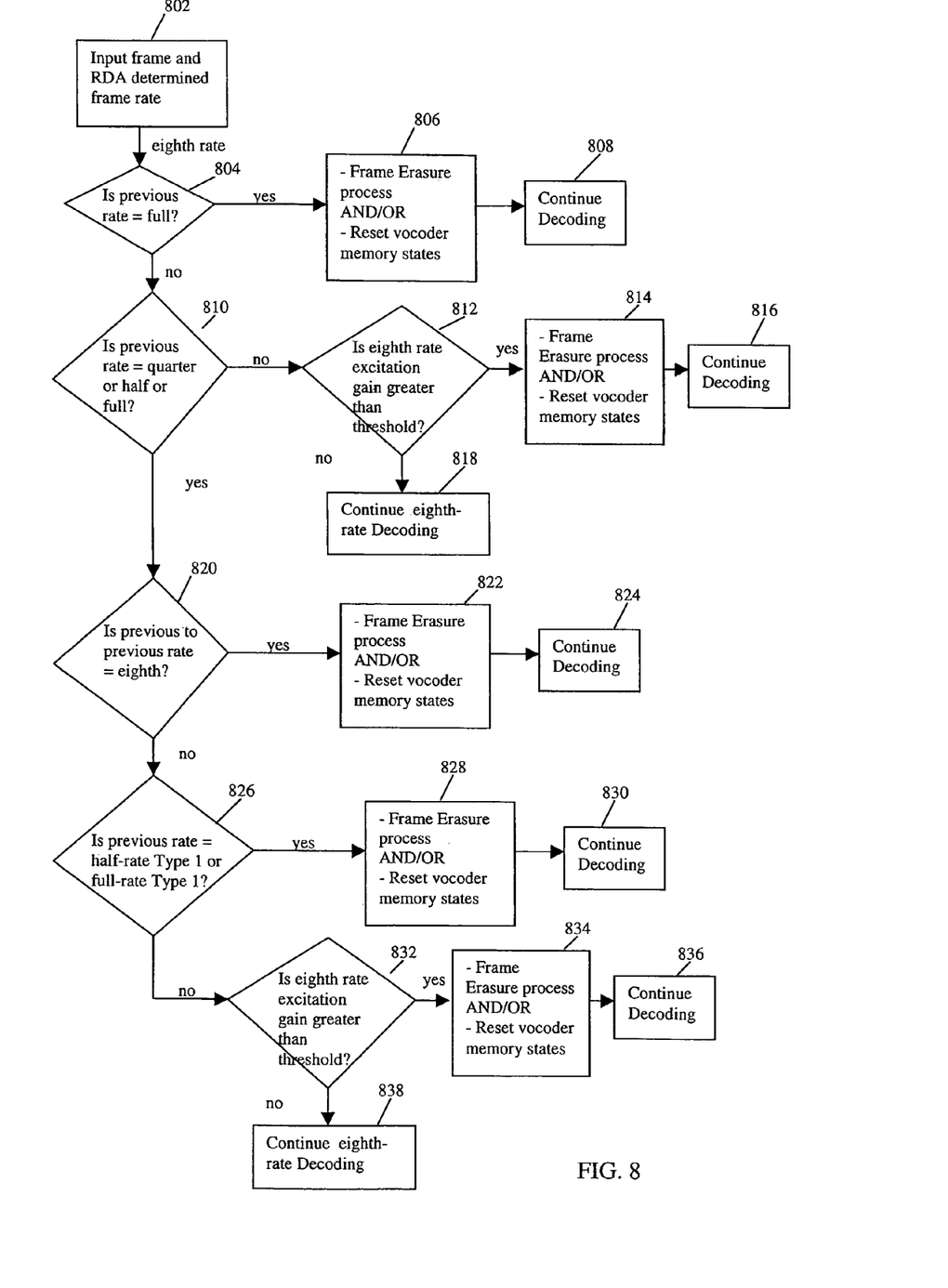
FIG. 8 is a flowchart diagram of a method for detection of rate errors in frames identified as eighth rate frames.

FIG. 8 illustrates a method in accordance with one embodiment for detection of rate errors in frames identified by the RDA as eighth rate frames. One skilled in the art will understand that ordering of steps illustrated in FIG. 8 is not limiting. The method is readily amended by omission or re-ordering of the steps illustrated without departing from the scope of the disclosed embodiments.

In step 802, the rate error detector inputs a data frame determined by the RDA to be an eighth rate frame. Control flows to step 804.

In step 804, the previous frame is checked to determine whether it is a full rate frame. If the previous frame is not a full rate frame, indicating a legal rate transition, control flow proceeds to step 810. If the previous frame is a full rate frame, indicating an illegal rate transition, control flow proceeds to step 806.

In step 806, frame erasure processing, and/or memory state reset processing may be performed. Control flow proceeds to step 808 where decoding continues.

In step 810, the previous frame is checked to determine whether it is a quarter rate, half rate, or full rate frame. If the previous frame is a quarter rate, half rate, or full rate frame, indicating a possible illegal rate transition, control flow proceeds to step 820. If the previous frame is not a quarter, half, or full rate frame, indicating a legal eighth rate transition, control flow proceeds to step 812.

In step 812, the eighth rate excitation gain is compared to a maximum threshold value. If the eighth rate excitation gain is less than the threshold value, control flow proceeds to step 818 where eighth rate decoding continues. If the eighth rate excitation gain is greater than the threshold value, indicating a rate error, control flow proceeds to step 814.

In step 814, frame erasure processing, and/or memory state reset processing may be performed. Control flow proceeds to step 816 where decoding continues.

In step 820, the second previous frame is checked to determine whether it is an eighth rate frame. If the second previous frame is not an eighth rate frame, indicating a legal rate transition, control flow proceeds to step 826. If the second previous frame is an eighth frame, indicating an illegal rate transition, control flow proceeds to step 822.

In step 822, frame erasure processing, and/or memory state reset processing may be performed. Control flow proceeds to step 824 where decoding continues.

In step 826, the previous frame is checked to determine whether it is a half rate Type-1, or a full rate Type-1 frame. If the previous frame is not a half rate Type-1, or a full rate Type-1 frame, indicating a legal rate transition, control flow proceeds to step 832. If the previous frame is a half rate Type-1 frame or a full-rate Type-1 frame, indicating an illegal rate transition, control flow proceeds to step 828.

In step 828, frame erasure processing, and/or memory state reset processing may be performed. Control flow proceeds to step 830 where decoding continues.

In step 832, the eighth rate excitation gain is compared to a maximum threshold value. If the eighth rate excitation gain is less than the threshold value, control flow proceeds to step 838 where eighth rate decoding continues. If the eighth rate excitation gain is greater than the threshold value, indicating a rate error, control flow proceeds to step 834.

In step 834, frame erasure processing, and/or memory state reset processing may be performed. Control flow proceeds to step 836 where decoding continues.

FIG. 9 is a scatter plot showing the relationship between the normalized FCB gain and the LP prediction gain. Circles below the solid curve were generated by clean speech, and the asterisks above the solid lines correspond to unacceptable screeches caused by RDA errors. The solid curve represents a threshold curve that separates the region of good speech from unacceptable screeches. This threshold can easily be represented in a parametric form and incorporated into the rate error detector.

Thus, a novel and improved method and apparatus for detection of rate errors in variable rate receivers have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

The previous description of the preferred embodiments is provided to enable any person skilled in the art to make or use the disclosed embodiments. The various modifications to these embodiments will be readily apparent to those skilled in the art, and the generic principles defined herein may be applied to other embodiments without the use of the inventive faculty. Thus, the disclosed embodiments are not intended to be limited to the embodiments shown herein but is to be accorded the widest scope consistent with the principles and novel features disclosed herein.

We claim:

1. A method for detecting rate errors in a variable rate receiver, comprising:
   receiving an encoded speech signal;
   performing a rate determination algorithm on the speech signal to provide a rate for a current frame;
   providing a set of illegal rate transitions which are based upon knowledge of speech classification and phonetic character of conversational speech; and
   detecting errors in the provided rate by determining whether a rate transition from a rate for a previous frame to the rate for the current frame is within the set of illegal rate transitions.

2. The method of claim 1, additionally comprising storing the set of illegal rate transitions of consecutive frames of speech in the variable rate receiver.

3. The method of claim 2 wherein the set of illegal rate transitions comprises a full-rate frame followed by an eighth-rate frame.

4. The method of claim 2 wherein the set of illegal rate transitions comprises a full-rate, Type-1 frame followed by an eighth-rate frame.

5. The method of claim 2 wherein the set of illegal rate transitions comprises a half-rate, Type-1 frame followed by an eighth-rate frame.

6. The method of claim 2 wherein the set of illegal rate transitions comprises a quarter-rate frame followed by a Type-1 full-rate frame.

7. The method of claim 2 wherein the set of illegal rate transitions comprises a quarter-rate frame followed by a Type-1 half-rate frame.

8. The method of claim 2 wherein the set of illegal rate transitions comprises an eighth-rate frame followed by a Type-1 full-rate frame.

9. The method of claim 2 wherein the set of illegal rate transitions comprises an eighth-rate frame followed by a Type-1 half-rate frame.

10. The method of claim 2 wherein the set of illegal rate transitions comprises an eighth-rate frame followed by a quarter-rate frame followed by an eighth-rate frame.

11. The method of claim 2 wherein the set of illegal rate transitions comprises an eighth-rate frame followed by a half-rate frame followed by an eighth-rate frame.

12. The method of claim 2 wherein the set of illegal rate transitions comprises an eighth-rate frame followed by a full-rate frame followed by an eighth-rate frame.

13. The method of claim 1 wherein the detecting errors in the provided rate comprises:
    encoding at least one reserved bit of a frame of speech to a predetermined value; and validating the predetermined value of a received reserved bit corresponding to the encoded reserved bit.

14. The method of claim 1 wherein the detecting errors in the provided rate comprises:
encoding an unused filter type identifier for a frame of speech to a predetermined value; and
validating the predetermined value of an unused filter type identifier corresponding to the encoded filter type identifier.

15. The method of claim 14 wherein the filter type identifier comprises two bits.

16. The method of claim 15 wherein three of four two-bit combinations identify three filter types, and one two-bit filter type identifier combination is unused.

17. The method of claim 1 further comprising perceptually smoothing the effects of detected rate errors by performing memory state reset processing.

18. The method of claim 17 wherein the memory state reset processing comprises overwriting memory values with zeros.

19. The method of claim 17 wherein the memory state reset processing comprises overwriting memory values with initialization values.

20. The method of claim 17 wherein the memory state reset processing is performed on moving-average vector quantizer memory for fixed code book gain.

21. The method of claim 17 wherein the memory state reset processing is performed on excitation memory.

22. The method of claim 17 wherein the memory state reset processing is performed on LPC synthesis memory.

23. The method of claim 17 wherein the memory state reset processing is performed on post-filter synthesis memory.

24. A rate error detection system, comprising:
means for receiving an encoded speech signal;
means for performing a rate determination algorithm on the speech signal to provide a rate for a current frame;
means for providing a set of illegal rate transitions which are based upon knowledge of speech classification and phonetic character of conversational speech; and
means for detecting errors in the provided rate by determining whether a rate transition from a rate for a previous frame to the rate for the current frame is within the set of illegal rate transitions.

25. The error detection system of claim 24 wherein the means for receiving an encoded speech signal is a mobile subscriber unit.

26. The error detection system of claim 24 wherein the means for receiving an encoded speech signal is a base station transceiver.

27. The error detection system of claim 24, additionally comprising means for storing the set of illegal rate transitions of consecutive frames of speech.

28. The error detection system of claim 27 wherein the means for providing a set of illegal rate transitions comprises means for providing an illegal rate transition for a full-rate frame followed by an eighth-rate frame.

29. The error detection system of claim 27 wherein the means for providing a set of illegal rate transitions comprises means for providing an illegal rate transition for a full-rate, Type-1 frame followed by an eighth-rate frame.

30. The error detection system of claim 27 wherein the means for providing a set of illegal rate transitions comprises means for providing an illegal rate transition for a half-rate, Type-1 frame followed by an eighth-rate frame.

31. The error detection system of claim 27 wherein the means for providing a set of illegal rate transitions comprises means for providing an illegal rate transition for a quarter-rate frame followed by a Type-1 full-rate frame.

32. The error detection system of claim 27 wherein the means for providing a set of illegal rate transitions comprises means for providing an illegal rate transition for, a quarter-rate frame followed by a Type-1 half-rate frame.

33. The error detection system of claim 27 wherein the means for providing a set of illegal rate transitions comprises means for providing an illegal rate transition for an eighth-rate frame followed by a Type-1 full-rate frame.

34. The error detection system of claim 27 wherein the means for providing a set of illegal rate transitions comprises means for providing an illegal rate transition for an eighth-rate frame followed by a Type-1 half-rate frame.

35. The error detection system of claim 27 wherein the means for providing a set of illegal rate transitions comprises means for providing an illegal rate transition for an eighth-rate frame followed by a quarter-rate frame followed by an eighth-rate frame.

36. The error detection system of claim 27 wherein the means for providing a set of illegal rate transitions comprises means for providing an illegal rate transition for an eighth-rate frame followed by a half-rate frame followed by an eighth-rate frame.

37. The error detection system of claim 27 wherein the means for providing a set of illegal rate transitions comprises means for providing an illegal rate transition for an eighth-rate frame followed by a full-rate frame followed by an eighth-rate frame.

38. The error detection system of claim 24 wherein the means for detecting errors in the provided rate comprises:
means for encoding at least one reserved bit of a frame of speech to a predetermined value; and
means for validating the predetermined value of a received reserved bit corresponding to the encoded reserved bit.

39. The error detection system of claim 24 wherein the means for detecting errors in the provided rate comprises:
means for encoding an unused filter type identifier for a frame of speech to a predetermined value; and
means for validating the predetermined value of an unused filter type identifier corresponding to the encoded filter type identifier.

40. The error detection system of claim 24 further comprising means for perceptually smoothing the effects of detected rate errors by performing memory state reset processing.

41. The error detection system of claim 40 wherein the means for perceptually smoothing the effects of detected rate errors comprises means for overwriting memory values with zeros.

42. The error detection system of claim 40 wherein the means for perceptually smoothing the effects of detected rate errors comprises means for overwriting memory values with initialization values.

43. The error detection system of claim 40 wherein the means for perceptually smoothing the effects of detected rate errors comprises means for performing memory state reset processing on moving-average vector quantizer memory for fixed code book gain.

44. The error detection system of claim 40 wherein the means for perceptually smoothing the effects of detected rate errors comprises means for performing memory state reset processing on excitation memory.

45. The error detection system of claim 40 wherein the means for perceptually smoothing the effects of detected rate errors comprises means for performing memory state reset processing on LPC synthesis memory.

46. The error detection system of claim 40 wherein the means for perceptually smoothing the effects of detected rate errors comprises means for performing memory state reset processing on and post-filter synthesis memory.

47. The error detection system of claim 40 wherein the means for perceptually smoothing the effects of detected rate errors comprises means for overwriting memory values with initialization values.

48. A rate error detection system, comprising:
a receiver for receiving an encoded speech signal;
a rate determination element for performing a rate determination algorithm on the speech signal to provide a rate for a current frame;
an element for providing a set of illegal rate transitions which are based upon knowledge of speech classification and phonetic character of conversational speech; and
a rate error detector for detecting errors in the provided rate by determining whether a rate transition from a rate for a previous frame to the rate for the current frame is within the set of illegal rate transitions.

49. The rate error detection system of claim 48 additionally comprising a memory for storing the set of illegal rate transitions of consecutive frames of speech.

50. The rate error detection system of claim 48 wherein the rate error detector comprises:
an encoder for encoding at least one reserved bit of a frame of speech to a predetermined value; and
a rate error detector for validating the predetermined value of a received reserved bit corresponding to the encoded reserved bit.

51. The rate error detection system of claim 48 wherein the rate error detector comprises:
an unused filter type identifier for a frame of speech to a predetermined value; and
a rate error detector for validating the predetermined value of an unused filter type identifier corresponding to the encoded filter type identifier.

52. The rate error detection system of claim 48 wherein the rate error detector comprises a rate error detector for perceptually smoothing the effects of detected rate errors by performing memory state reset processing.

53. A storage medium comprising instructions that when executed cause a computer to perform a method of:
receiving an encoded speech signal;
performing a rate determination algorithm on the speech signal to provide a rate for a current frame;
providing a set of illegal rate transitions which are based upon knowledge of speech classification and phonetic character of conversational speech; and detecting errors in the provided rate by determining whether a rate transition from a rate for a previous frame to the rate for the current frame is within the set of illegal rate transitions.

54. The storage medium of claim 53, wherein the instructions additionally cause the computer to store the set of illegal rate transitions of consecutive frames of speech.

* * * * *

UNITED STATES PATENT AND TRADEMARK OFFICE
CERTIFICATE OF CORRECTION

PATENT NO.       : 7,590,096 B2
APPLICATION NO.  : 10/938445
DATED            : September 15, 2009
INVENTOR(S)      : El-Maleh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Twenty-first Day of September, 2010

David J. Kappos
*Director of the United States Patent and Trademark Office*